United States Patent [19]
Cummins

[11] Patent Number: 6,033,178
[45] Date of Patent: Mar. 7, 2000

[54] TRASH CONTAINER LIFTING AND TRANSPORTING DEVICE

[76] Inventor: Robert L. Cummins, Rte. 2, Box 236, Enfield, N.C. 27823

[21] Appl. No.: 08/986,852

[22] Filed: Dec. 8, 1997

[51] Int. Cl.⁷ .................................................... B60R 9/00
[52] U.S. Cl. ........................... 414/462; 224/402; 224/553
[58] Field of Search ................................ 224/42.38, 402, 224/543, 545, 553; 414/462, 917

[56] References Cited

U.S. PATENT DOCUMENTS

| | | | |
|---|---|---|---|
| 2,051,265 | 8/1936 | Martin | 224/553 |
| 2,338,955 | 1/1944 | Metcalf . | |
| 2,409,103 | 10/1946 | Cameron . | |
| 2,663,474 | 12/1953 | Kelly . | |
| 2,930,500 | 3/1960 | Ellis | 414/462 |
| 3,376,986 | 4/1968 | Farber . | |
| 3,740,097 | 6/1973 | Parker et al. . | |
| 4,252,492 | 2/1981 | Scothern | 414/541 |
| 4,298,151 | 11/1981 | O'Connor . | |
| 4,780,044 | 10/1988 | Elskamp | 414/917 X |
| 4,787,809 | 11/1988 | Zrostlik | 414/917 X |
| 4,944,434 | 7/1990 | Hamilton | 224/42.25 |
| 5,209,628 | 5/1993 | Hassell | 414/462 |
| 5,221,173 | 6/1993 | Barnes | 414/346 |
| 5,738,261 | 4/1998 | Dula | 414/462 |

FOREIGN PATENT DOCUMENTS

| | | | |
|---|---|---|---|
| 1 201 756 | 9/1965 | Germany | 414/408 |
| 3722184 | 2/1988 | Germany | 414/408 |

*Primary Examiner*—Janice L. Krizek
*Attorney, Agent, or Firm*—Mills Law Firm PLLC

[57] ABSTRACT

A trash container lifting device adapted for attachment to a motor vehicle for lifting and transporting a filled trash container to a remote site for pickup is disclosed. The lifting device includes a supporting frame which is attached to the motor vehicle, such as a pickup truck, without tools or attaching hardware. The supporting frame is mechanically coupled to an articulating frame for engaging a trash container on the ground surface and lifting it with a manual lever to a raised position for transport by the vehicle. A plurality of extension springs extend between the supporting frame and the articulating frame to provide the user with a mechanical advantage in lifting a loaded container which would otherwise be an unmanageable task for a single individual. The lifting device is adaptable to trash containers of various sizes and configurations with minor modifications.

10 Claims, 2 Drawing Sheets

TRASH CONTAINER LIFTING AND TRANSPORTING DEVICE

BACKGROUND OF INVENTION

1. Field of Invention

This invention relates generally to lifting devices and, more particularly, to an apparatus for lifting and transporting a standard residential trash container.

Portable refuse containers or trashcans are a well known fixture of modern residential life. Every homeowner is familiar with the weekly chore of transporting the trashcan to the curbside for pickup by the trash disposal service. This presents a difficult problem for the homeowner whose residence is a substantial distance from the curb.

Although many trash disposal services provide a wheeled container for this purpose, it remains a cumbersome task when the full container must be maneuvered for a substantial distance.

Thus, the present invention has been developed to provide a trash can lifting device which can be conveniently attached to a motor vehicle for transporting a trash container to the curb for pickup.

2. Description of Related Prior Art

U.S. Pat. No. 3,740,097 to Shirley L. Parker et al. discloses a vehicle dump bed for vehicles such as a pickup truck which can be easily mounted on and removed from the vehicle bed. The dump bed is provided with fixtures for lifting a refuse container as the bed is lowered and for transporting the container from one place to another.

U.S. Pat. No. 3,376,986 to H. Farber discloses a detachable garbage can carrier comprising a fixture that is adapted for engaging the handles of a standard cylindrical trash can. The detachable carrier can be mounted on any suitable cart such as a two-wheel shopping cart for transporting the trashcan to the curbside.

U.S. Pat. No. 4,944,434 to Kenneth B. Hamilton discloses an automobile portable hauler for transporting supplies and equipment on the exterior of a conventional motor vehicle. The portable hauler uses brackets that are adapted to fit over the door of the vehicle when the window is open and in a down position.

U.S. Pat. No. 4,298,151 to Brian J. O'Connor discloses a carrier rack for mounting and carrying bicycles on a motor vehicle which includes structures for clamping the rack between the trunk and trunk lid or between some other opening in the automobile and a closure appending to that opening.

U.S. Pat. No. 2,338,955 to Hollis H. Metcalf discloses an automobile carrier adapted for mounting on the rear bumper and trunk of a vehicle which can be positioned to carry various loads thereon.

U.S. Pat. No. 2,409,103 to J. C. A. Cameron discloses an automobile luggage carrier including fixtures for clamping the carrier to the rear bumper and window frame of the vehicle. However, no lifting mechanism is disclosed in this patent.

U.S. Pat. No. 2,663,474 to Edward J. Kelly discloses an outboard motor carrier including fixtures for clamping the carrier between the trunk and trunk lid of a motor vehicle. However, no lifting mechanism is disclosed in this patent.

U.S. Pat. No. 4,252,492 to Clinton Y. Scothern discloses a detachable lift unit for pickup trucks wherein the lifting is readily attached to and detached from the end of the bed of a pickup truck without the use of tools or other apparatus.

Finally, U.S. Pat. No. 5,221,173 to Kevin P. Barnes discloses a multi-vehicle transport system for bulk materials including a primary vehicle operable to go to remote areas and discharge the contents of a standard bin into a hopper, and a secondary load vehicle operable using a hydraulically actuated forklift system to lift and discharge the contents of the hopper from the primary load vehicle into the secondary load vehicle.

SUMMARY OF THE INVENTION

After much research and study of the above described problem, the present invention has been developed to provide a trash container lifting device which can be mounted on the tailgate of a standard pickup truck to engage and lift the trash container for transport by the vehicle.

The lifting device is supported by a pair of J-shaped members which are hung over the tailgate of the pickup truck without the use of tools or other apparatus. The lifting mechanism comprises an articulating frame that pivots downwardly to engage the trash container on the ground and upwardly to lift the container for transport.

The reciprocal lifting movement is accomplished by an elongated handle extending between the support frame and the articulating frame and is assisted by heavy-duty extension springs which provide a mechanical advantage in lifting the load.

In view of the above, it is an object of the present invention to provide a trash container lifting device which will provide a homeowner with a convenient means of lifting and transporting a trash container which could not otherwise be lifted by a single individual.

Another object of the present invention is to provide a trash container lifting device which may be conveniently mounted on a motor vehicle such as a pickup truck without the use of tools or other apparatus.

Another object of the present invention is to provide a trash container lifting device which utilizes a plurality of heavy-duty extension springs to gain a mechanical advantage in lifting the trash container.

Another object of the present invention is to provide a trash container lifting device which is adaptable for use with various standard sized trash containers.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
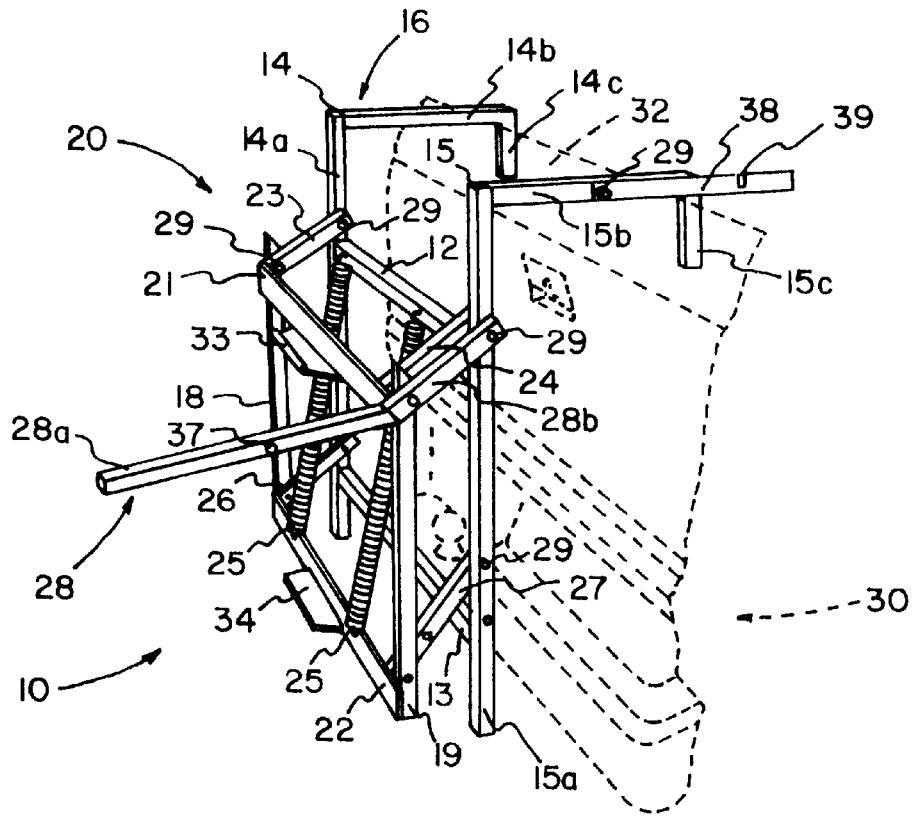
FIG. 1 is a perspective view of the trash container lifting device of the present invention shown mounted on the tailgate of a pickup truck.

With further reference to the drawings, there is shown therein a trash container lifting device in accordance with the present invention, indicated generally at 10 and illustrated in FIG. 1. The lifting device 10 is shown installed on the tailgate 32 at the rear end of a pickup truck, indicated generally at 30, in phantom outline.

In the preferred embodiment, the lifting device 10 is comprised of a supporting frame, indicated generally at 16; an articulating frame, indicated generally at 20; a pair of extension springs 25 and a hand lever indicated generally at 28.

The supporting frame 16 includes a pair of inverted J-shaped members 14 and 15 secured in generally parallel relation by cross members 12 and 13 extending therebetween and being fixedly attached thereto by weldment or attaching hardware.

Each of the J-shaped members 14 and 15 are comprised of a long leg member 14a and 15a, a short leg member 14b and 15b, and a stop member 14c and 15c respectively.

In the preferred embodiment the J-shaped members 14 and 15 are fabricated from rectangular tubing such as steel, aluminum or other suitable material and the component members thereof are joined together by welding.

The short leg members 14b and 15b are fabricated to a predetermined length such that the long leg members 14a and 15a are disposed in generally vertical relation to the ground surface when the supporting frame 16 is positioned over the tailgate 32 of the pickup truck 30 as shown in FIG. 1.

The articulating frame 20 is generally rectangular and comprised of a pair of vertically opposed, tilting brackets 18 and 19 which are interconnected by the upper and lower lift brackets 21 and 22 extending transversely therebetween and being fixedly attached thereto by weldment or attaching hardware.

Figure 3:
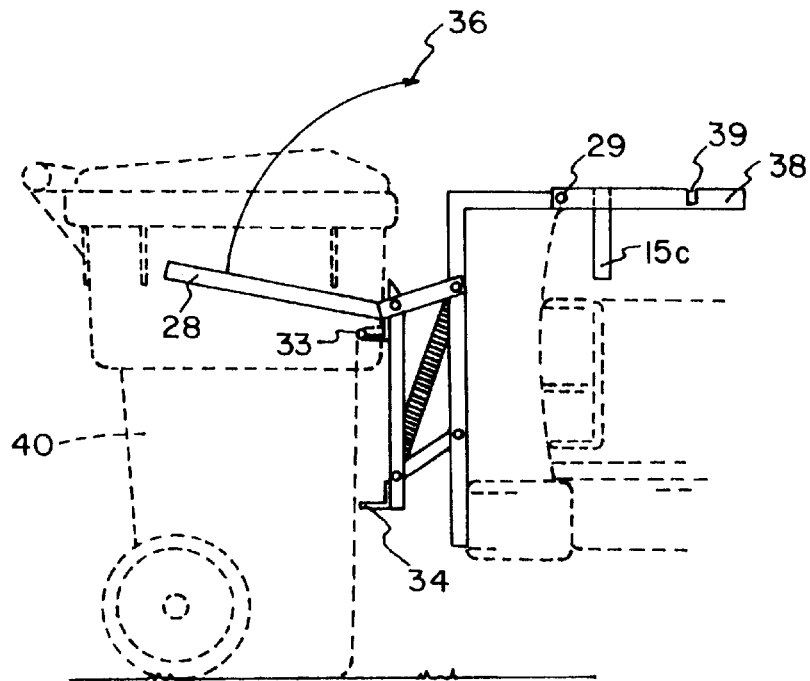
FIG. 3 is a side elevational view of the trash container lifting device engaging a trash container on the ground surface.
Figure 4:
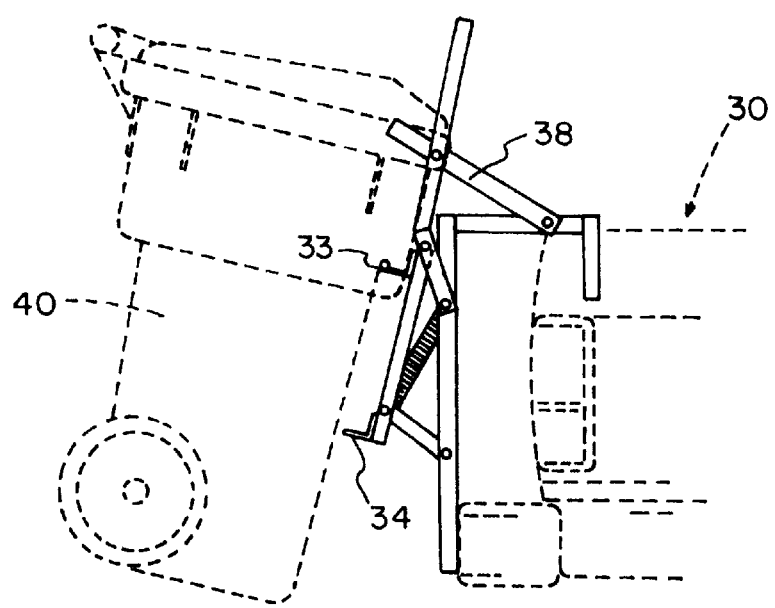
FIG. 4 is a side elevational view of the trash container lifting device shown in a raised position after lifting the trash container off the ground surface.

In the present invention the articulating frame 20 is adapted for reciprocal upward/downward movement in a plane generally parallel to that plane defined by the supporting frame 16 in order to lift a trash container 40 of the type depicted in phantom outline in FIGS. 3 and 4.

The lifting mechanism of the present invention will now be described in detail. The articulating frame 20 is mechanically coupled to the supporting frame 16 by a pair of upper arm brackets 23 and 24 and a pair of lower arm brackets 26 and 27 respectively as illustrated in FIG. 1. More particularly, the upper arm bracket 23 and the lower arm bracket 26 are pivotally attached at one end thereof to the long member 14a of J-shaped member 14 by machine bolts 29 which are inserted through coaxial pivot holes (not shown) formed therein.

The opposite ends of the upper arm bracket 23 and the lower arm bracket 26 are also pivotally attached to the tilting bracket 18 by use of machine bolts 29 extending through coaxial pivot holes (not shown) formed therein.

In similar fashion, the upper arm bracket 24 and the lower arm bracket 27 are pivotally attached at one end thereof to the long member 15a of J-shaped member 15 by the use of machine bolts 29 which extend through coaxial pivot holes (not shown) formed therein.

Similarly, the opposite ends of upper arm bracket 24 and lower arm bracket 27 are pivotally attached to the tilting bracket 19 by the use of machine bolts 29 which extend through coaxial pivot holes (not shown) formed therein.

Of course, other suitable attaching hardware may be utilized to secure the articulating frame 20 to the supporting frame 16 and the embodiment described hereinabove is merely illustrative and is not intended to be restrictive in any sense.

Figure 2:
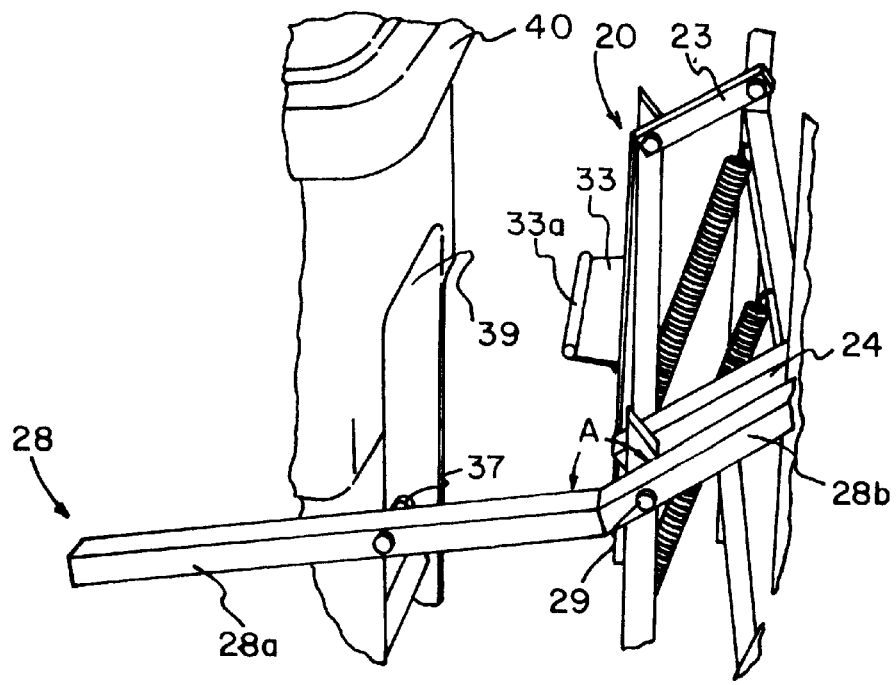
FIG. 2 is a an enlarged perspective view of the trashcan lifting device showing the lifting mechanism in disengaged relationship to a trash container.

It will be noted that an elongated hand lever 28 is provided which consists of a long member 28a and short member 28b as more clearly shown in FIG. 2. In the preferred embodiment the hand lever 28 is also fabricated from a generally rectangular tubing fabricated from steel, aluminum, or other suitable material.

It will be noted that the long member 28a and the short member 28b are joined at a predetermined angle A to provide the optimal lifting leverage to a user of the lifting device 10.

As shown in FIGS. 1 and 2, the short member 28b of the hand lever 28 is pivotally attached in parallel relation to the upper arm bracket 24 by machine bolts 29. In this arrangement it will be appreciated that upward/downward movement of hand lever 28 by a user will produce a corresponding movement of the articulating frame 20 critical to the present invention.

In the preferred embodiment a pair of coiled extension springs 25 are attached at one end thereof to the upper cross member 12 and at an opposite end thereof to the lower lift bracket 22 using suitable attaching hardware.

It will be appreciated by those skilled in the art that the extension springs 25 are fabricated to a predetermined load capacity and overall length to provide a user with the maximum lifting capability during use of the present lifting device.

Since such extension springs are well known to those skilled in the art, further detailed discussion of the same is not deemed necessary.

Still referring to FIG. 1 it can be seen that each of the upper and lower lift brackets 21 and 22 is provided with a foot bracket 33 and 34 respectively which projects outwardly in generally perpendicular relation thereto. In the preferred embodiment each of the foot brackets 33 and 34 are fabricated from a generally rectangular plate of a metal material. Each foot bracket may include a bead or lip as at 33a formed along a forward edge thereof which functions to engage a recessed portion 39 of the trash container 40 as shown in FIG. 2.

Thus, in practical use of the present invention, a user will initially position the lifting device 10 over the tailgate 32 of a pickup truck or other similar vehicle such that the stop members 14c and 15c engage the tailgate 32 and support the lifting device 10 in the position shown.

Next, a trash container 40 is maneuvered into position in proximity to the foot bracket 33 as shown in FIG. 2. It will be appreciated that the box-shaped trash container 40 illustrated in the drawings is of a type often utilized in residential trash disposal service having a capacity ranging from 30 to 95 gallons.

Of course, the lifting device 10 can be adapted to fit various types of trash containers such as cylindrical containers (not shown) with minor modification to the foot brackets 33 and 34.

Such modifications to fit specific trash containers are considered to be within the scope and intended purpose of the present invention.

Next, in the preferred arrangement the user will push downwardly on the hand lever 28 to position the foot bracket 33 at the appropriate vertical height to engage the recess 39 or other mating feature of the trash container 40 as shown in FIG. 3. It will be appreciated by those skilled in the art that in this position the springs 25 are extended and placed under maximum tension by the downward force against the hand lever 28.

Thereafter, the user will push the hand lever 28 upwardly as shown by the directional indicator 36 using manual arm strength in combination with the contraction of springs 25 to raise the trash container 40 to the position illustrated in FIG. 4.

In the embodiment illustrated in FIGS. 3 and 4, it can be seen that the upper foot bracket 33 bears the load of the trash container 40 as the lower foot bracket 34 functions to guide and steady the trash container as it is lifted into position.

Once the trash container 40 has been lifted to the position shown in FIG. 4, a latch 38 is utilized to engage the hand lever 28 to secure it in position. In the preferred embodiment latch 38 is comprised of an elongated steel bar that is pivotally attached to the short member 15b of J-shaped member 15 by a machine bolt 29 extending through coaxial pivot holes (not shown) formed therein.

Latch 38 includes a U-shaped notch 39 formed therein which engages a latch pin 37 projecting from the hand lever 28 in a predetermined position. In this arrangement the latch 38 engages and holds the hand lever 28 supporting the trash container 40 in the raised position shown in FIG. 4.

In the position shown in FIG. 4, the trash container 40 may be conveniently transported by the vehicle to the curbside location for pickup. The user will release the latch 38 and lower the trash container 40 to the ground surface controlling the weight of the load manually with the assistance of the spring resistance provided by the springs 25.

Thereafter, the trash container 40 is easily disengaged from the upper foot bracket 33 and returned to the latched condition shown in FIG. 4 until needed.

In the alternative, the lifting device 10 can be simply removed from the tailgate 32 and placed in the bed of the pickup truck or elsewhere for future use.

From the above it can be seen that the trash can lifting device of the present invention provides the user with a tool for lifting and transporting a residential trash container over substantial distances to the curbside for pickup.

The trash container lifting device provides the homeowner with a mechanical advantage in lifting a heavy trash container which would otherwise be an unmanageable load for a single person.

The trash container lifting device can be adapted for use with various residential and commercial trash containers which are available in different sizes and configurations.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A trash container lifting device comprising:

supporting frame means including a pair of inverted J-shaped members for temporary attachment of said device to a tailgate of a motor vehicle;

articulating frame means being mechanically coupled to said supporting frame means so as to be capable of reciprocal upward and downward movement by operation of a hand lever being pivotally attached to both said supporting frame means and said articulating frame means; and extension spring means extending between said supporting frame means and said articulating frame means providing a user of said device with a mechanical advantage in lifting said trash containers.

2. The trash container lifting device of claim 1, wherein said J-shaped members are disposed in parallel relation and interconnected by a plurality of cross-members being fixedly attached thereto.

3. The trash container lifting device of claim 2 wherein said J-shaped members are fabricated to predetermined dimensions to permit said supporting frame means to be installed over a tailgate of a pickup truck such that such supporting frame means is disposed in a vertical plane.

4. The trash container lifting device of claim 1 wherein said articulating frame means and said supporting frame means are disposed in a vertically opposed relationship, said supporting frame means and said articulating frame means being interconnected by a plurality of arm brackets extending therebetween and being pivotally attached thereto.

5. The trash container lifting device of claim 1 wherein engaging means are provided on said frame means for vertically lifting said trash container, said engaging means including at least one foot bracket being configured to engage a mating feature formed in said trash container, said foot bracket functioning to bear the weight of said trash container as it is lifted into a raised position.

6. The trash container lifting device of claim 5 wherein said foot bracket is configured to engage a generally box-shaped trash container.

7. The trash container lifting device of claim 5 wherein said foot bracket is configured to engage a cylindrical trash container.

8. The trash container lifting device of claim 1 wherein said extension spring means are rated to accommodate a trash container of a specific load capacity.

9. The trash container lifting device of claim 8 wherein said extension spring means are fabricated to a predetermined length so as to be placed under tension whenever said lifting device engages said trash container.

10. A lifting device for raising and transporting a trash container carried on the rear tailgate of a truck vehicle, said trash container having a lifting surface for facilitating raising and lower thereof, said lifting device comprising: a support frame temporarily attached to the tailgate including a load bearing member slidably disposed over said tail gate and engaging a top surface thereof and a vertical support member disposed rearwardly of the tail gate; a lifting member spaced rearwardly from said support member and having a first rearwardly projecting member engagable with the lifting surface of the trash container in a lower position and a second projecting member engagable with the trash container for stabilizing the trash container during vertical movement thereof; linkage means pivotally connected between said support member and said lifting member accommodating vertical movement of said lifting member and a trash container carried thereby from said lower position to a raised position; an operating handle connected to said lifting frame and said linkage means, said operating handle projecting rearwardly of said lifting member and effective for moving said lifting member between said lower position and said raised position; spring means connected between an upper portion of said support member and lower portion of said lifting member for biasing said lifting member toward said raised position; and lock means operative between said operating handle and said support frame for locking said lifting member in said raised position.

* * * * *